Oct. 14, 1941.  H. J. MURPHY  2,259,425
NUT MEMBER
Filed May 31, 1939  2 Sheets-Sheet 1

INVENTOR
HOWARD J. MURPHY,
by John Todd Att'y.

Oct. 14, 1941.                H. J. MURPHY                2,259,425
                               NUT MEMBER
                          Filed May 31, 1939                2 Sheets-Sheet 2

INVENTOR
HOWARD J. MURPHY,
by John Todd   Att'y.

Patented Oct. 14, 1941

2,259,425

UNITED STATES PATENT OFFICE 2,259,425

NUT MEMBER

Howard J. Murphy, Greenwood, Mass., assignor to United-Carr Fastener Corporation, Cambridge, Mass., a corporation of Massachusetts Application May 31, 1939, Serial No. 276,546

2 Claims. (Cl. 85—32)

This invention relates to spring nuts and particularly to nuts used in combination with a bolt for holding two members tightly together. The nut is of the type adapted to be passed quickly over the end of the bolt and drawn tightly against one of the members by one or more turns of the bolt to hold the members tightly together.

Spring nuts are known and used which provide a base and resilient tongues struck from the base which define an opening at their ends for receiving a bolt during passage of the nut over the end of a bolt. In these nuts the bolt-receiving opening has a diameter which is less than the major diameter of the bolt with the result that the tongues move apart against their spring tension during passage over the crests of the bolt threads and then contract to engage within the angles of the threads. Then when the nut is tightened down the tongues follow the bolt threads downwardly, at the same time moving into closer relation at their free ends so as to fetch up against the bolt shank. These nuts may also have a base portion which is normally arched so as to cause the tongues to exert an inward force on the shank of the bolt when the base has been flattened as a result of tightening the nut. While nuts of this class have been generally satisfactory and have been used in great quantities, my present invention sets out a nut effecting differences in mechanical construction directed to an improved action over the aforesaid known constructions.

One object of my present invention is the provision of a nut capable of gripping more firmly the shaft of a bolt when in pre-tightened assembly with the bolt so that after accidental unloosement from tightened position it is impossible for the nut to ride free from the bolt shank even though the installation with which it is assembled is subjected to substantial jar or vibration.

Another object of my invention is the provision of a nut capable, as a result of its particular construction, of being moved over a bolt into position for final tightening action more easily than the aforesaid known nuts and particularly those known nuts intended to be used with larger size bolts.

Another object is directed to the construction of my improved nut effecting a quick and very positive locking of the tongues with the bolt shank upon turning the bolt to tighten finally the nut.

Other objects and features of my invention will be apparent from inspection of the drawings and specification hereinbelow set forth.

Referring to the drawings, in which I have illustrated preferred embodiments of my invention:

Figure 1:
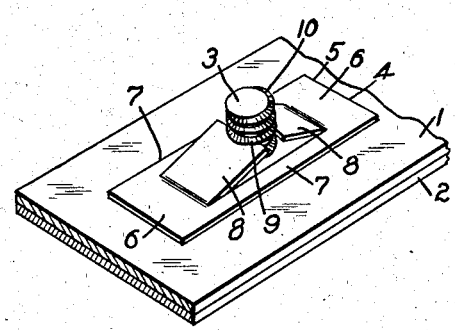
Fig. 1 is a perspective view showing my first form of nut member used in combination with a bolt for securing two parts together.
Figure 2:
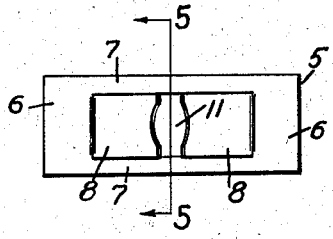
Fig. 2 is a top plan view of my first form of nut member per se.
Figure 5:
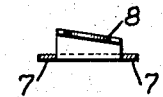
Fig. 5 is a sectional view taken along the line 5—5 of Fig. 2.

Referring to the drawings, I have shown an installation comprising a pair of superposed plates 1 and 2, a bolt 3 extending through the plates and my first form of nut member 4 tightened down upon the bolt to secure the plates in fixed contiguous relation.

My first form of nut member 4 is made from one piece of sheet metal and provides an elongated base portion 5 comprising end portions 6—6 connected together by relatively narrow flexible connecting portions 7—7. In my preferred form of nut member the base is normally flat before assembly with the bolt. A pair of tongues 8—8 struck from the base 5 extend from the end portions 6—6 toward each other and in angular relation to the fastener base. The tongues 8—8, in my preferred form, have a width which is greater than the combined widths of the connecting portions 7—7 whereby the relatively great width of the tongues gives strength and rigidity to the nut member and at the same time may be a direct aid to effecting the improved action of the nut member, as will be hereinafter described. The tongues have bolt-engaging free ends which may be twisted and otherwise shaped in any suitable way to engage properly between the threads 9 of the bolt shank 10. The free ends of the tongues are disposed in spaced relation and define an opening 11 for receiving the shank 10. The opening 11, in my preferred form, has a smaller diameter than the major diameter of the shank 10. Assembly of the nut with the bolt to hold the parts together is a relatively simple matter and is carried out through exerting pressure upon the ends 6 of the nut base 5 to bow the base at the connecting portions 7—7. This action causes the tongues 8 to move apart a distance greater than the major diameter of the shank 10. Then the nut member is moved along the shank relying almost entirely upon the bowed formation of the base to allow the tongues 8 to pass over the threads. Any resiliency in the tongues tending to aid passage of the same over the threads is merely supplemental and the nut may be quickly moved substantially adjacent the parts to be secured together without reliance upon the aforesaid resiliency of the tongues 8 which in small nuts made of relatively thin material cannot be entirely eliminated.

Figure 3:
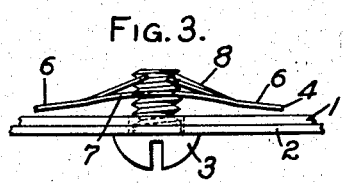
Fig. 3 is a side elevation of the installation of Fig. 1 showing the manner in which my first form of nut grips firmly the bolt shank in assembled untightened position relative to the bolt shank.

The normal diameter of the bolt-receiving opening 11 is of predetermined smaller dimension relative to the major diameter of the shank 10 so as to effect a bowing of the base when the nut member is in assembled untightened position (Fig. 3). Thus the tongues 8, in said untightened position, engage tightly between the threads under the tension effected by the tendency of the base to return to normal flat shape. When the base is tightened down against the parts to be secured together through rotation of the bolt, the base tends to flatten out while the tongues follow the screw threads toward the base, at the same time exerting progressively increasing inward force upon the bolt shank. As a result, when the base 5 has become completely or nearly flattened, the tongues have locked so tightly with the shank that continued rotation of the bolt as a result of unnaturally great force applied to the same would cause a stripping of the threads of the bolt shank.

Figure 8:
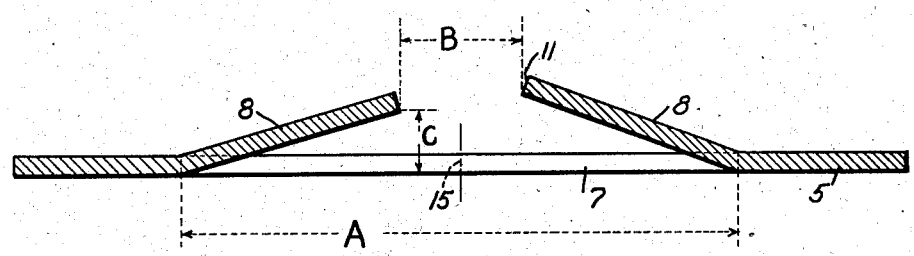
Fig. 8 is a diagrammatic view, greatly enlarged, showing my first form of nut member before assembly with a bolt.
Figure 9:
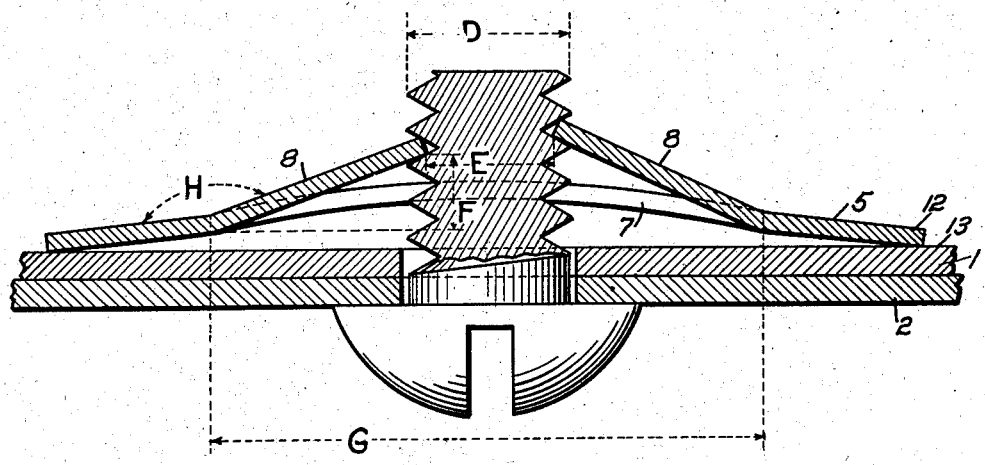
Fig. 9 is a diagrammatic view, greatly enlarged, showing my first form of nut member at the limit of its pre-tightened positions on the bolt shank and immediately preceding final tightening action.
Figure 10:
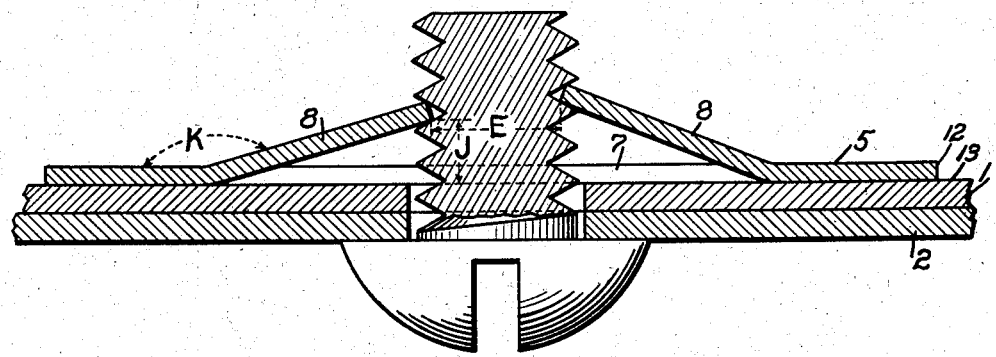
Fig. 10 is a diagrammatic view, greatly enlarged, showing my first form of nut member in final locked engagement with the bolt shank.

In order to explain in greater detail the improved action of my preferred form of nut member, reference is made to Figs. 8, 9 and 10 in which I have shown enlarged diagrammatic views of my nut member in three positions relative to the bolt. These diagrammatic drawings are intended to illustrate the theory only under which the nut member works when the dimensions of all the parts are in exact preferred relation, it being understood that unavoidable differences in dimensions of the screw and nut due to manufacturing tolerances may cause a different action than that illustrated in the diagrammatic drawings, but which nevertheless effects a good fastening resulting from improvements embodied within the present invention.

Thus in Fig. 8 I have shown the nut member in normal position prior to assembly with the bolt shank. The base portion 5 is in normal flat position and for purposes of later comparison the distance between the points of junction of the tongues 8 with the base portion is shown at A. B is the diameter of the bolt-receiving opening 11 and the normal distance between the lower corner of the lower of the tongues 8 and the lower surface of the base 5 is shown at C.

The nut member is preferably placed upon the bolt by bowing the base to move the tongues a distance apart greater than the major diameter D of the bolt shank and passing the nut over the shank to move the same into assembled untightened position with the free ends 12 of the base 5 in close relation to the upper surface 13 of the top plate 1. As a result of the relative width of the tongues 8—8 as compared with the narrower connecting portions 7, the latter portions yield during the bowing action at substantially the centers 15 thereof. The centers 15 shown in dotted lines in Fig. 8 preferably lie in a vertical plane passing through the center of the opening 11. Thus outward movement of the tongues to enlarge the bolt-receiving opening to permit passage of the shank of the bolt therebetween is effected almost entirely as a result of the bowing of the connecting portions 7 and little, if any, through expansion of the tongues as a result of engagement thereof with the threads of the shank during passage over the threads. As a result of this method it is not necessary for the tongues to yield relative to the base at their points of junction with the base during passage over the threads, as is the case with known nuts, and my present nut may be easily passed over the bolt shank by hand even though the nut is made of relatively thick material as for use with a ¼-inch bolt. This action in initial assembly of my present nut is an improvement over previously known nuts and particularly known nuts formed from relatively thick material wherein it is difficult to exert enough downward pressure on the nut by hand to expand the tongues to effect passage of the same over the threads.

After the nut has been placed over the shank of the bolt and moved down to preferred final untightened position with the free ends 12 of the base 5 in close relation to the top plate 1, downward pressure upon the base tending to bow the connecting portions 7 is relaxed whereupon the portions 7 tend to expand toward normal flat position. As a result of the fact that the distance E (Fig. 9), which is the distance between the free ends of the tongues in bolt-engaging position, is greater than the distance B (Fig. 8), it is impossible for the connecting portions 7 to return to normal position. Thus the free ends of the tongues 8 engage between the bolt threads, as shown in Fig. 9, in a firm grip against the tension of the connecting portions 7 striving to return to normal flat position. It will be noticed in my preferred construction that the distance G (Fig. 9) is slightly less than the distance A (Fig. 8) and the distance F (Fig. 9), which is the distance between the lower corner of the lower tongue 8 and a horizontal plane through the junction of the tongues and base at their lower sides, is relatively greater than the distance C of Fig. 8. Also, it will be seen that the angle H at the junction of the tongues and base in the positions of portions of the nut shown in Fig. 9 may remain substantially the same as in the normal positions illustrated in Fig. 8.

When the nut is tightened against the plate 1, pressure exerted upon the tongues 8 during turning of the bolt is transmitted to the ends of the base 5 which move outwardly away from the bolt shank. During this action the connecting portions 7 tend to flatten out. The tongues 8 ride down the bolt threads during the tightening action and at the same time move inwardly so as to grip the shank with progressively increasing force. When the base has nearly reached flat shape, the tongues 8 may have fetched up so tight that they are caused to lift slightly when the base reaches absolute flat position with the result that the distance J (Fig. 10) is slightly greater than the distance C of Fig. 8 and the angle K of Fig. 10 is slightly less than the angle H of Fig. 9. When the base is in final flat position shown in Fig. 10, it is incapable of further expansion with the result that further rotation of the bolt through unusual force applied thereto would tend to bring the tongues 8 downwardly toward the base 5. However, the tongues 8 in theory are exerting maximum force upon the bolt thread without cutting into the thread substantially at the time the base reaches flat shape and as a consequence, further inward movement of the tongues as a result of continued rotation of the bolt must cause the tongues to dig into the threads with consequent stripping of the same.

Thus it will be seen that as a result of my improved construction the spring tension exerted by the tongues 8 when the nut is in assembled untightened position shown in Fig. 9 makes it impossible for the nut to be shaken loose from the bolt even though the device is subjected to continuous jar and vibration.

Furthermore, the construction of my nut device to my preferred relative dimensions set out above wherein the tongues may fetch up in a position in higher relation to the base than in normal relative position effects a quick and very positive locking action. At the same time, as a result of the relative positions of the tongues when finally locked with the shank, it is impossible to bring the tongues far enough down to enable the nut base to be turned inside out.

In addition, it will be seen that the nut in final tightened position exerts an upward stress upon the bolt as a result of the tendency of the base to move into the bowed shape of assembled untightened position thus tending to draw the plates tightly together.

Figure 6:
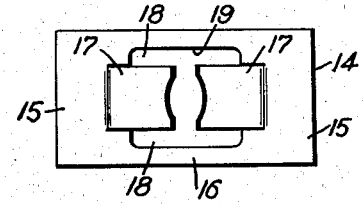
Fig. 6 is a top plan view of my second form of nut member per se.

In Fig. 6 I have shown a second form of nut member comprising a base 14 having end portions 15—15 connected by narrow flexible connecting portions 16. Tongues 17 are struck up from the base 14 which are similar in form to the tongues 8 of my first form of nut member. It will be seen that the end portions 15 are wider than in my first form and extend beyond the lines of junction of the tongues 17 therewith toward the center of the base so as to give additional strength to the nut member, as may be required if the nut member is made very small and of relatively thin material. In this form of my invention there are relatively wide openings 18 between the longitudinal edges of the tongues 17 and the inner longitudinal edges 19 of the connecting portions 16.

Figure 7:
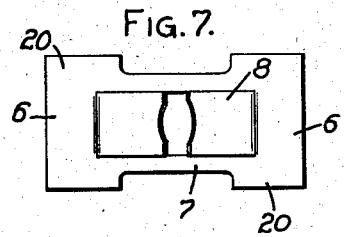
Fig. 7 is a top plan view of my third form of nut member per se.
Figure 4:
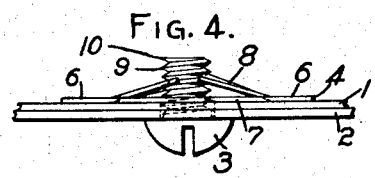
Fig. 4 is a side elevation similar to Fig. 2 showing the nut member in final tightened or locked position.

In Fig. 7 I have illustrated a third form of my invention which is similar to my first form, but differs from the same in that I have widened the base at desired points by providing wing portions 20 at opposite sides of each of the end portions 6 which extend beyond the lines of junction of the tongues 8 with the end portions 6 toward the center of the base. These wing portions serve to strengthen the nut member should it be desired.

Although I have illustrated and described preferred embodiments of my invention, I do not wish to be limited thereby because the scope of my invention is best defined by the following claims.

I claim:

1. A spring nut comprising a flexible base portion having end portions and connecting portions extending between the end portions and spaced apart, said connecting portions being of such thin material and such narrow width at at least one point between the end portions that the base portion is easily bent along a line transverse to said connecting portions by manual pressure applied to said end portions, and bolt-engaging portions integrally joined to said end portions and projecting from the plane of said base, said bolt-engaging portions having their free ends terminating in spaced relation and providing a bolt-receiving opening therebetween, said base being adapted to be moved over the free end of said bolt, said free ends of said bolt-engaging portions being spaced apart in normal unflexed shape of said base portion a distance less than the diameter of a bolt to be extended therebetween whereby said free ends may engage frictionally said bolt under the spring tension of said bent base at all points along the axial length of said bolt at which said nut may be disposed, and said base being flexible to a degree to enable said bolt-engaging portions to move over said bolt substantially without yielding at their points of junction with said base.

2. A spring nut comprising a flexible base portion having end portions and connecting portions extending between the end portions and spaced apart, said connecting portions being of such thin material and such narrow width at at least one point between the end portions that the base portion is easily bent along a line transverse to said connecting portions by manual pressure applied to said end portions, and tongue portions integrally joined to said end portions and projecting from the plane of said base, said tongue portions having their free ends terminating in spaced relation and providing a bolt-receiving opening therebetween, said base being adapted to be moved over the free end of a threaded bolt, said free ends of said tongues being spaced apart in normal unflexed shape of said base a predetermined distance less than the smallest root diameter which may ordinarily be provided on a threaded bolt of predetermined outside diameter whereby said free nds may engage frictionally said bolt between the threads thereof under the spring tension of said bent base at all points along the axial length of said bolt at which said nut may be disposed, and said base being flexible to a degree to enable said tongues to move over said bolt threads substantially without yielding at their points of junction with said base.

HOWARD J. MURPHY.